United States Patent
Evans et al.

[11] Patent Number: 6,115,440
[45] Date of Patent: Sep. 5, 2000

[54] QUICK RELEASE, REMOVABLE TOP NOZZLE ASSEMBLY

[75] Inventors: Paul Marcus Evans, Lexington; Edmund Emory DeMario, Columbia; Michael Thomas Sloop, Hopkins; David Douglas Seel, Columbia, all of S.C.

[73] Assignee: Westinghouse Electric Company LLC, Pittsburgh, Pa.

[21] Appl. No.: 09/069,354

[22] Filed: Apr. 29, 1998

[51] Int. Cl.[7] .............. G21C 15/02; G21C 3/32; G21C 3/334; G21C 3/34

[52] U.S. Cl. ............. 376/364; 376/446; 376/440; 376/438; 376/434

[58] Field of Search .................. 376/364, 440, 376/446, 449, 438; 285/921

[56] References Cited

U.S. PATENT DOCUMENTS

| | | | |
|---|---|---|---|
| 3,382,153 | 5/1968 | Bigge et al. | 176/40 |
| 3,608,933 | 9/1971 | Lee | 285/39 |
| 3,769,158 | 10/1973 | Winders | 176/78 |
| 3,864,211 | 2/1975 | King et al. | 176/78 |
| 3,953,287 | 4/1976 | Long et al. | 176/78 |
| 3,992,259 | 11/1976 | Anthony et al. | 176/78 |
| 4,064,004 | 12/1977 | Long et al. | 176/78 |
| 4,219,386 | 8/1980 | Osborne et al. | 176/76 |
| 4,381,284 | 4/1983 | Gjertsen | 376/364 |
| 4,452,755 | 6/1984 | Hylton | 376/364 |
| 4,552,427 | 11/1985 | Landgreen | 339/89 |
| 4,631,168 | 12/1986 | Shallenberger et al. | 376/446 |
| 4,637,914 | 1/1987 | Boyle et al. | 376/353 |
| 4,687,619 | 8/1987 | Wison et al. | 376/260 |
| 4,687,631 | 8/1987 | Wilson et al. | 376/446 |
| 4,863,396 | 9/1989 | Johnson | 439/470 |
| 5,015,435 | 5/1991 | Petit | 376/285 |
| 5,131,687 | 7/1992 | Marchou | 285/23 |
| 5,133,927 | 7/1992 | Kadano et al. | 376/462 |
| 5,268,948 | 12/1993 | Church et al. | 376/446 |
| 5,361,283 | 11/1994 | Attix | 376/446 |
| 5,363,423 | 11/1994 | Brashier et al. | 376/446 |
| 5,367,548 | 11/1994 | Attix | 376/446 |
| 5,844,958 | 12/1998 | Leroux et al. | 376/446 |

FOREIGN PATENT DOCUMENTS

| | | | |
|---|---|---|---|
| 0073728 | 9/1983 | European Pat. Off. | G21C 5/06 |
| 0 098 774 | 1/1984 | European Pat. Off. | 376/446 |
| 201859 | 11/1986 | European Pat. Off. | 376/440 |
| 63-229389 | 9/1988 | Japan | 376/446 |
| 1478985 | 7/1977 | United Kingdom | 376/440 |
| 95/18451 | 7/1995 | WIPO | 376/446 |

OTHER PUBLICATIONS

Newman, B & W Aims for 50GWd/tU and more, Nuc. Eng. Int., p. 28 figure, Aug. 1987.

*Primary Examiner*—Charles T. Jordan
*Assistant Examiner*—Jack Keim

[57] ABSTRACT

The adaptor plate of a top nozzle assembly is removably secured to selected thimble tubes in a nuclear fuel assembly by quick release couplings. The openings in the adaptor plate aligned with the selected thimble tubes are counter-bored from above to form shoulders with diametrically opposed slots extending downward through the shoulders. The quick release couplings include a sleeve secured to the upper end of the thimble tube. A support plate fixed to the sleeve has a pair of upwardly extending bosses engaging the slots in the adaptor plate. A latch member with a pair of diametrically opposed outwardly projecting latch ears rotates on the sleeve between a first position in which the latch ears are aligned with the slots and are positioned over the bosses so that the adaptor plate may be lifted off, and a second position with the latch ears overlaying the shoulder to latch the adaptor plate to the thimble tube. A spring member with a cylindrical body has a pair of diametrically opposed radially compliant projections formed by bulges in strips defined by circumferential slits spaced from the bottom edge of the cylindrical body which engage detents in the bosses to latch the latch member in the first, unlatched position even with the adaptor plate removed, and which engage detents in the opening in the adaptor plate to latch the latch member in the second, latched position.

12 Claims, 4 Drawing Sheets

QUICK RELEASE, REMOVABLE TOP NOZZLE ASSEMBLY

BACKGROUND OF THE INVENTION

1. Field of the Invention

This invention relates generally to fuel assemblies for nuclear reactors, and more particularly to a top nozzle assembly in which the adaptor plate can be quickly and easily installed and removed from the fuel assembly.

2. Background Information

The fuel for a pressurized water nuclear reactor is encased in long Zircalloy tubes forming fuel rods. A number of the fuel rods are supported in arrays, for instance 14×14 or 17×17, by a series of spaced metal support grids joined together by thimble tubes to form fuel assemblies. A series of such fuel assemblies are arranged in parallel groups to make up the core of the pressurized water reactor.

When fuel assemblies are in operation, fuel rods may become damaged requiring removal of the rod from the assembly. Removal of the rod requires that the fuel assembly be removed from the core to a separate location. The top nozzle of the fuel assembly is then removed and the damaged fuel rod is replaced. The top nozzle is reinstalled and the assembly is returned to the core. Each of these operations is performed under water with specially designed tooling, thus increasing the difficulty of the operation. The nozzle removal is often performed on a critical path during a refueling outage, hence, rapid reconstitution is vital.

The top nozzle typically includes an adaptor plate having flow openings which control the flow of reactor coolant upward through the fuel assembly and other openings which accommodate the thimble tubes. Currently available removable top nozzles include a type in which slotted inserts lock into the nozzle adaptor plate. The insert has a formed detent which locks into a circumferential groove in the adaptor plate. With the insert engaging the groove in the adaptor plate, a lock tube is inserted from above. This lock tube fixes the insert in place and completes the attachment of the removable top nozzle to the fuel assembly.

Although this arrangement does provide access to the fuel rods, several problems of have been identified during reconstitution efforts. First, top nozzle removal is difficult because forces required to disjoint the nozzle from the assembly are occasionally excessive. The difficulty in removing the top nozzle results in an increased possibility of damage to the assembly, and usually a higher cost.

Second, once the top nozzle is removed, the inserts are left exposed to possible damage from rod replacement tooling. Although damage of the inserts from rod replacement tooling is rare, the possibility of damage to the inserts increases the amount of care taken while replacing the rods. This inevitably results in increased time required for reconstitution.

Third, once the lock tubes are removed they must be stored and inspected. Handling these tubes with remote tooling provides the possibility that one of the tubes may be damaged, dropped or lost. The removal, handling and inspection operation all increase the time required for reconstitution.

Alternative arrangements for removable top nozzles include some designs in which the components of the joint are captured and either remain with the adaptor plate or the thimble tube when the adaptor plate is removed. Unfortunately, the currently available removable nozzle assemblies of this type require expensive components. Also, some of them are not readily adaptable to all types of fuel assemblies. For instance, in some fuel assemblies the joints between the Zircalloy thimble tubes and the stainless steel grids which cannot be welded, are made by bulging of the tubing. The bulging operation affects the length of the tubing, which as a result cannot be precisely determined. Hence, the joints between the thimble tubes and the adaptor plate must accommodate for this imprecision in tube length. As mentioned, the available quick release connections are either not compatible with this arrangement or require expensive parts.

There is a need, therefore, for an improved quick release removable top nozzle assembly.

There is a more specific need for such an improved top nozzle assembly which can accommodate for the imprecise length of the thimble tubes.

There is an additional need for such an improved top nozzle assembly in which the components are captured when the adaptor plate is removed, yet utilizes inexpensive easily manufactured components.

SUMMARY OF THE INVENTION

These needs and others are satisfied by the invention which is directed to a quick release, removable top nozzle assembly which includes an adaptor plate having a plurality of spaced circular openings aligned with the thimble tubes with selected ones of the openings being counterbored from above to form an annular internal upwardly facing shoulder. At least one, and preferably a pair of diametrically opposed slots, extend axially through the shoulder. In addition, the opening has at least one and preferably a diametrically opposed pair of outwardly extending detents in the cylindrical wall thereof.

The top nozzle assembly further includes a quick release coupling for the selected openings in the adaptor plate. Each quick release coupling includes a sleeve secured to the associated thimble tube which extends into the opening in the adaptor plate. An annular latch member rotatably mounted on the sleeve has at least one and preferably a pair of diametrically opposed outwardly projecting latch ears configured to pass through the slot or slots through the shoulder in the adaptor plate. The annular latch member has a first rotational position in which the latch ears are aligned with the slots for removal of the adaptor plate and a second rotational position with the latch ear or ears overlaying the shoulder to latch the adaptor plate in place. A compliant member in the form of a latch spring secured to the annular latch member for rotation therewith has at least one, and preferably a pair, of diametrically opposed outwardly directed radially compliant projections engaging the detent or detents in the cylindrical wall of the opening in the adaptor plate to latch the annular member in the second position. A retainer member fixed to the free end of the sleeve secures the annular latch member on the sleeve.

As another aspect of the invention, the quick release coupling includes a support plate fixed to the sleeve and extending generally transverse thereto. At least one, and preferably a pair of diametrically opposed bosses extend upward on lobes on the support plate and are sized to engage the slot or slots in the adaptor plate. A compliant member compliantly latches the latch member to the boss or bosses to retain the latch member in the first position, even with the adaptor plate removed. The bosses have boss detents on an inner arcuate surface which are engaged by radially compliant projections on the compliant member to latch the latch member in the first position in which the adaptor plate can be removed.

Preferably, the compliant member comprises a cylindrical body and at least one , but preferably diametrically opposed, radially compliant projections or bulges formed in strips defined by circumferentially extending slits in the cylindrical body axially spaced from the bottom edge. These bulges engage the detents in the opening in the adaptor plate to latch the latch member in the second position with the latch ears overlaying the annular shoulder in the adaptor plate, and engage the boss detents to latch the annular latch member with the latch ears aligned with the slots in the adaptor plate in the first rotational position of the latch member. The cylindrical body of the compliant member has notches in the upper edge through which the latch ears on the annular latch member extend so that the latch member and the compliant member rotate together.

BRIEF DESCRIPTION OF THE DRAWINGS

A full understanding of the invention can be gained from the following description of the preferred embodiments when read in conjunction with the accompanying drawings in which.

DESCRIPTION OF THE PREFERRED EMBODIMENTS

Figure 1:
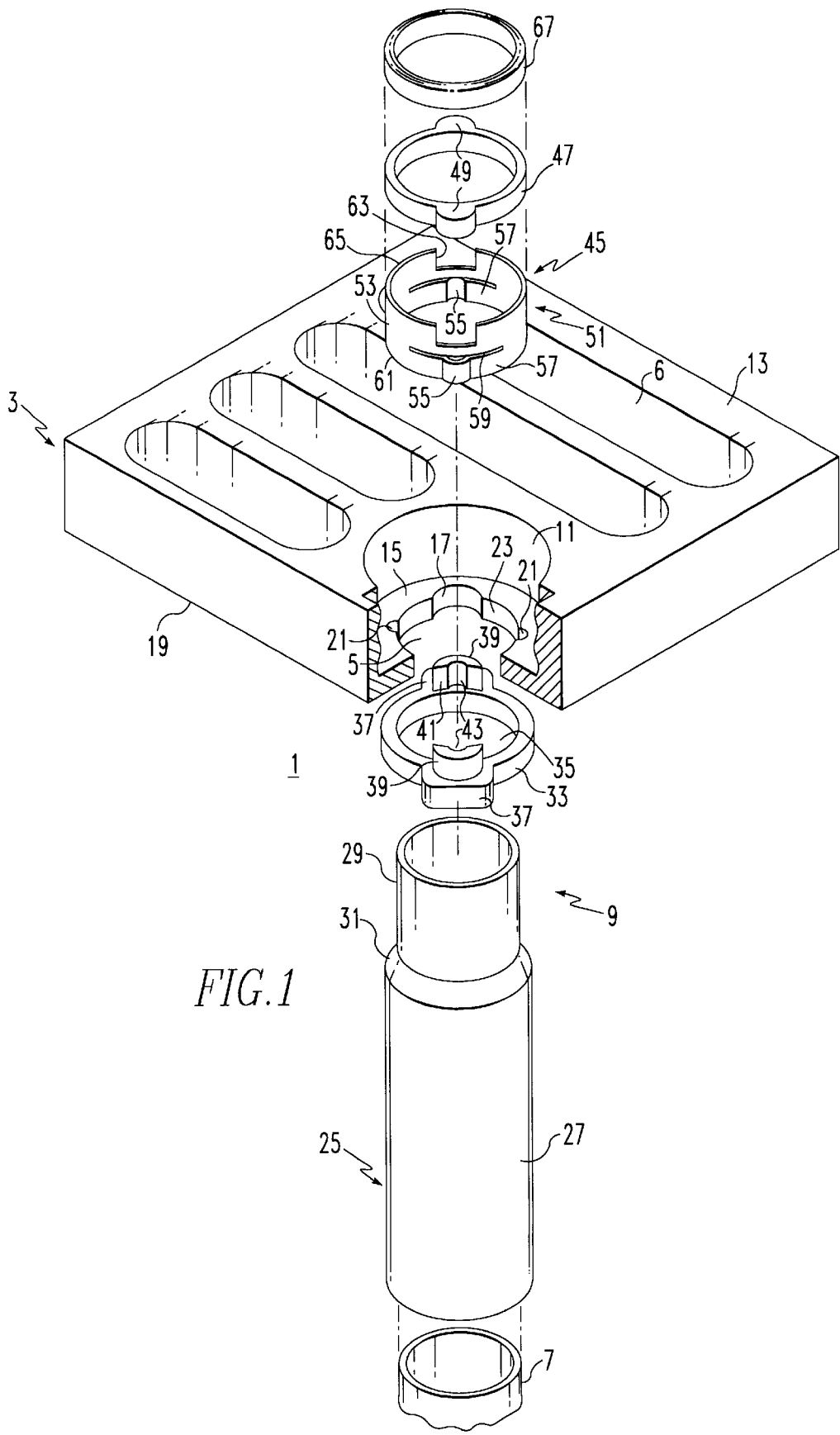
FIG. 1 is an exploded isometric view with parts cut away of a top nozzle assembly in accordance with the invention.

Referring to FIG. 1, the quick release, removable top nozzle assembly 1 for use in a nuclear fuel assembly includes an adaptor plate 3. This adaptor plate 3 has a number of openings 5 (only one shown) aligned with thimble tubes 7 of the fuel assembly. Additional openings 6 form passages for reactor coolant flow through the nozzle assembly. Selected ones of the openings 5 have quick release couplings 9 for securing the adaptor plate 3 to the associated thimble tube 7. Those selected openings 5 of the adaptor plate 3 have a counterbore 11 extending downward from the top face 13 of the adaptor plate to form an internal annular upwardly facing shoulder 15. A pair of diametrically opposed slots 17 (only one visible in FIG. 1) extend axially through the shoulder 15 to the bottom face 19 of the adaptor plate. In the exemplary embodiment of the invention, these slots 17 are semicircular in cross section. A pair of diametrically opposed detents 21 extend axially along the cylindrical wall 23 of the opening 5 and are spaced 90° from the slots 17. These detents 21 are also preferably semicircular in cross section.

Figure 2:
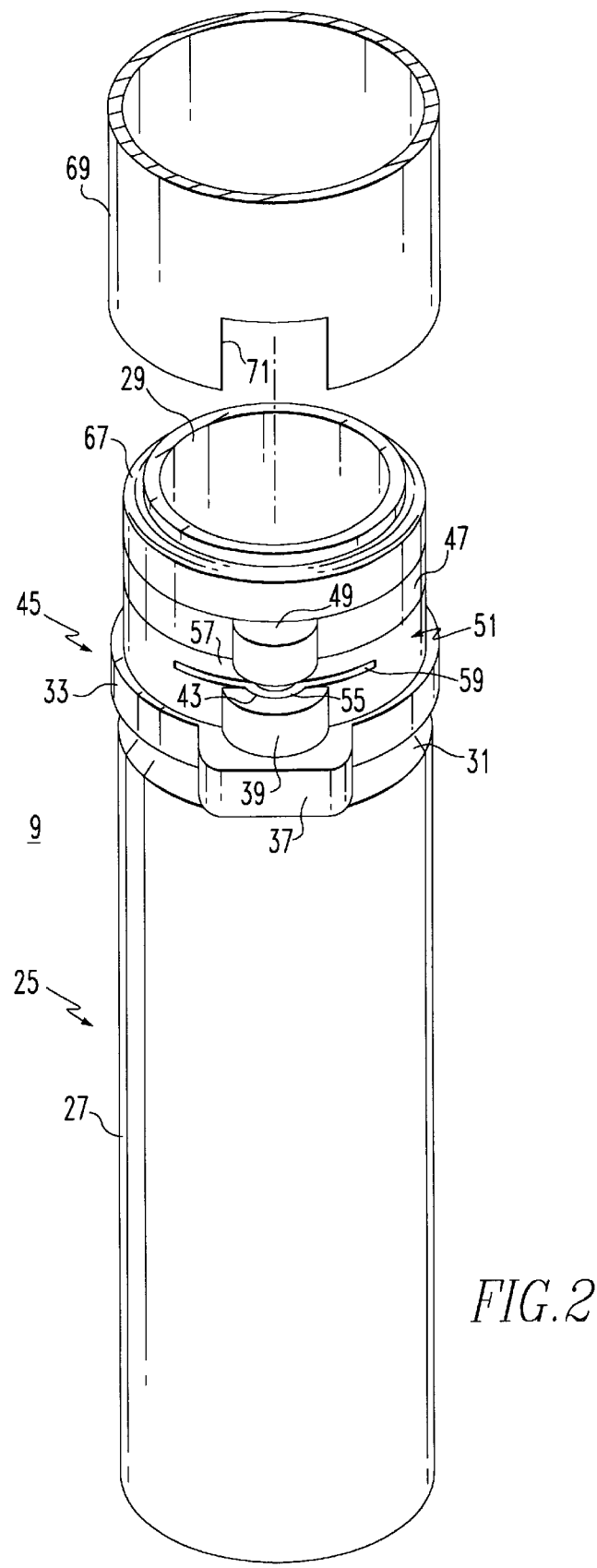
FIG. 2 is an isometric view of a quick release coupling which forms part of the assembly of FIG. 1.
Figure 3:
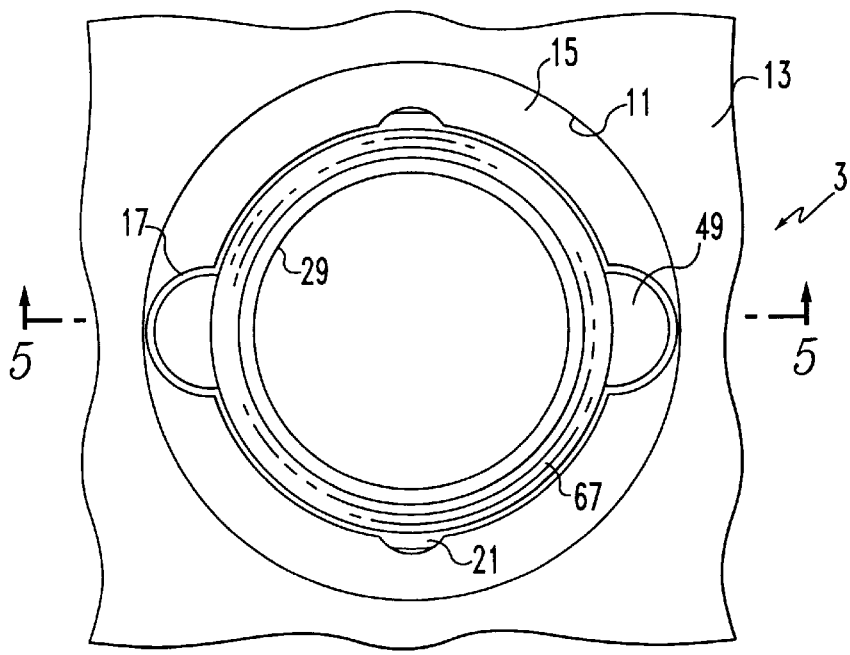
FIG. 3 is a plan view of a portion of the top nozzle assembly of the invention shown in the unlatched position.

Referring to FIG. 2, as well as to FIG. 1, the quick release coupling 9 includes a sleeve 25 with a lower section 27 sized to slip over the upper end of the thimble tube 7. A bulge joint (not shown) joins the sleeve 25 to the upper end of the thimble tube 27. An upper section 29 of the sleeve 25 having an outer diameter about that of the thimble tube 7 is joined to the lower section 27 by a tapered transition zone 31. This reduced diameter section 29 can be formed by swaging.

The quick release coupling 9 further includes an annular support plate 33 with a central opening 35 sized to secure the support plate on the upper section 29 of the sleeve 25 and seated against the transition zone 31 with an interference fit. Preferably, the support plate 33 is also welded to the sleeve 25 to fix it in place axially and rotationally. The support plate 33 has diametrically opposed lobes 37 extending radially outwardly therefrom. A pair of bosses 39 extend upwardly on the lobes 37. These bosses 39 are sized to engage the slots 17 in the adaptor plate, and therefore, in the exemplary embodiment of the invention have a semicircular outer dimension. The inner faces 41 of the bosses 39 are arcuate with a radius matching that of the opening 5. Semicircular boss detents 43 are formed in the arcuate interfaces 41 of the bosses 39.

A latch assembly 45 is also incorporated into the quick release coupling 9. This latch assembly includes an annular latch member 47 having at least one, and preferably a pair of diametrically opposed latch ears 49 extending outwardly therefrom. The latch ears are configured to pass through the slots 17 in the shoulder 15 of the adaptor plate 3, and therefore, in the exemplary embodiment of the invention are semicircular in cross section.

The latch assembly 45 further includes a compliant member 51 which includes a cylindrical body 53 of spring material. Again, at least one, and preferably a pair of diametrically opposed radially compliant projections 55 project outward at the lower end of the cylindrical body 53. These radially compliant projections 55 are formed by bulges in strips 57 defined by circumferential slits 59 spaced from the bottom edge 61 of the cylindrical body 53. As will be seen, these formed springs 55 latch the quick release coupling in latched and unlatched positions. The ears 49 on the latch member 47 engage notches 63 in the top edge 65 of the cylindrical body 53 to couple the latch member 47 to the compliant member 51 for movement together.

The final component of the quick release coupling 9 is a retainer member 67, preferably in the form of a ring which is fixed to the sleeve 25 such as by welding or flaring of the upper end of the sleeve. This retainer ring 67 captures the latch assembly 45 on the sleeve 25 so that the parts cannot be lost or misplaced during changeout of the fuel rods.

As discussed above, in some fuel assemblies, the thimble tubes 7 are joined to a number of grids by bulge joints each of which shortens the tube by an imprecise amount. The quick release coupling 9 of the invention accommodates for this indeterminate length of the thimble tubes. The coupling 9, assembled as shown in FIG. 2, is slipped over the top of the associated thimble tube, and with the adaptor plate in place can be adjusted to the correct vertical height at which the lower. section 27 of the sleeve 25 is secured to the thimble tube 7 by a bulge joint (not shown).

Figure 4:
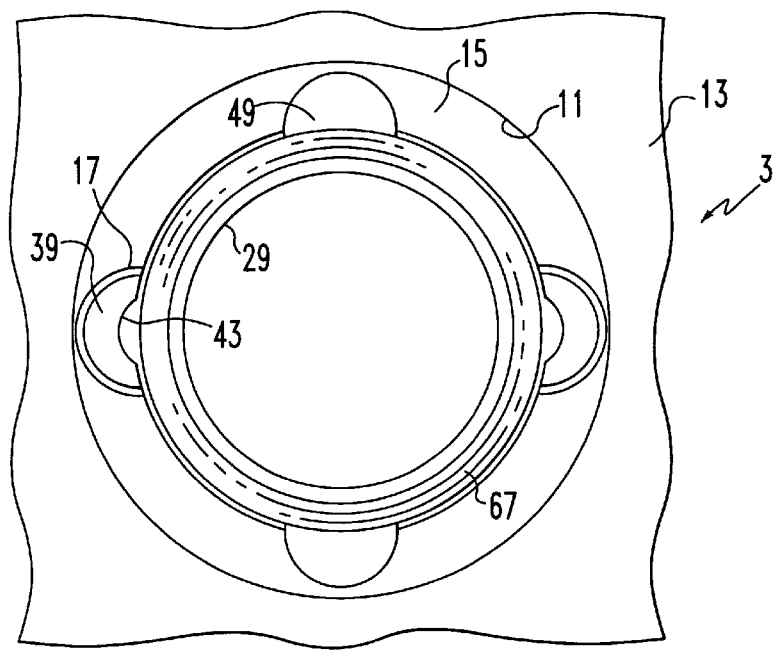
FIG. 4 is a view similar to FIG. 3 showing an assembly in the latched position.
Figure 5:
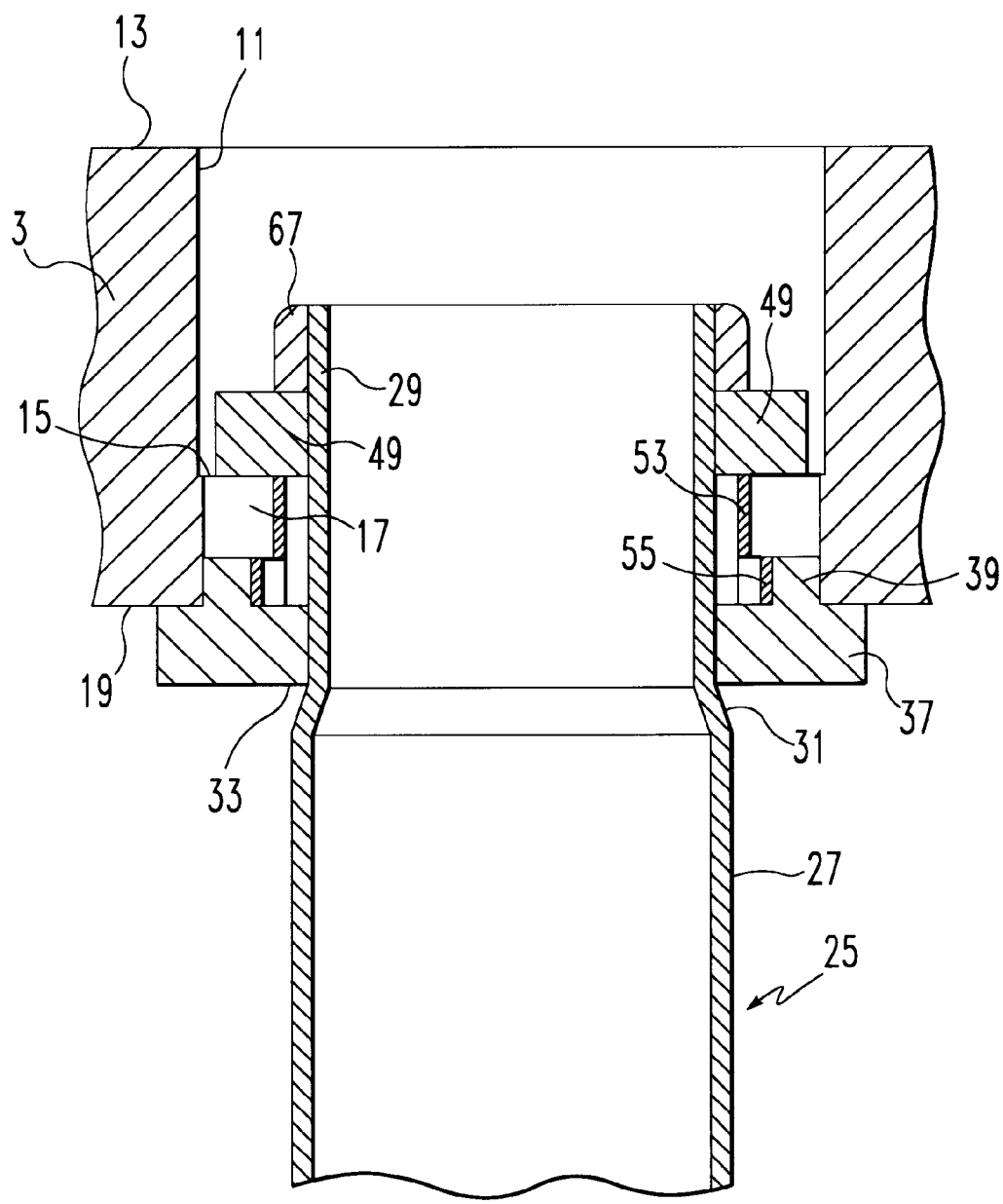
FIG. 5 is a vertical section taken along the line 5—5 in FIG. 3.

With the quick release coupling 9 affixed to the thimble tube 7 at the correct height, the adaptor plate is supported by the support plate 33. At the same time, the bosses 39 extend upward into the slots 17 extending down through the shoulder 15 in the adaptor plate. The support plate 33 also blocks upward flow of reactor coolant fluid through the opening 5. The compliant member 51 rotates on the support plate 33 and positions the latch ears 49 on the latch member 47 over the shoulder 15 formed by the counterbore 11. This latch member 47 can be rotated to the previously mentioned second rotational position in which the radially compliant projections 55 engage the detents 21 in the cylindrical wall 23 of the bore 5. As the latch ears 49 are keyed to these radially compliant projections 55, the ears overlay the shoulder 15, transverse to the axis between the bosses 39 to latch the adaptor plate 3 to the thimble tube 7. A suitable cylindrical tool 69 with notches 71 which engage the latch ears 49, can be inserted into the counterbore 11 to engage the ears 49 to rotate the latch assembly 45 90 degrees so that the latch ears 49 are aligned with the slot 17 as shown in FIGS. 4 and 5. In this previously described first rotational position of the latch assembly 45, the radially compliant projections 55 engage the detents 43 in the bosses 39 to latch the latch assembly in this open position. With the latch assembly 45 thus unlatched, the adaptor plate 3 can be lifted up over the latch ears 49 and off of the bosses 39 so that the fuel rods may be serviced. With the adaptor plate removed, the engagement of the detents 43 and the bosses 39 by the radially compliant projections 55, retains the latch assembly in the correct position for reinstallation of the adaptor plate. This also protects the latch assembly from damage during reconstitution.

The quick release coupling 9 is a simple mechanism which can be manufactured inexpensively. The support plate 33, the latch member 47 and the retainer ring 67 are stamped stainless steel parts. The sleeve 25 is a stainless steel sleeve swaged to form the reduced diameter upper section 29. The compliant member or locking spring 51 can be stamped from sheet metal strip and welded to form the cylinder.

An important part of the quick release coupling 9 is the support plate 33 which serves four purposes in the operation of the joint. The first function is to provide the detent 43 for engagement of the radially compliant projections 55 in the open position of the joint. The second function of the support plate is to provide alignment of the joint, and hence, the thimble tube, to the hole 5 in the adapter plate 3. Proper alignment of the joint in thimble tube 7 is essential to avoid excessive control rod drag. The support plate 33 prevents the flow of water through the opening 5 to prevent vibration of the joint or entrance of debris. The third function of the support plate 33 is to transmit compressive and in-core loads to the thimble tube 7. When compressive loads are applied to the nozzle, they are transmitted to the adaptor plate 3 and into the thimble tube 7. Finally, the geometry of the support plate 33 is such that any expansion of fuel rods will not cause interference with the support plates. It should be noted that the sleeves 25 can also be used on the thimble locations not requiring a quick release joint 9 and still provide support through seating of the adaptor plate 3 on the transition zone 31 of the sleeve.

The quick release top nozzle assembly 1 is a totally slip fit design allowing the adaptor plate 3 to cleanly fit over the quick release couplings 9. The invention offers several advantages over the currently used split insert joint. These include: reduced nozzle removal/installation time by allowing easy removal of the top nozzle including the adaptor plate; no loose parts; stronger insert that is less likely to be damaged; greatly simplified site tooling requirements which will reduce equipment cost, set-up time and crew size; increased axial joint strength permits a reduction in the total number of joints needed to carry the design loads and the unused locations will take only the swaged insert sleeve to provide alignment of the thimble tube; and reduce costs by allowing the use of precision-stamped parts for most of the joints finery components.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of invention which is to be given the full breadth of the claims appended and any and all equivalents thereof.

What is claimed is:

1. A quick release, removable top nozzle assembly for use in a nuclear fuel assembly having a plurality of thimble tubes, said top nozzle assembly comprising:

an adaptor plate having a plurality of spaced circular openings extending through said adaptor plate and aligned with said thimble tubes, selected ones of said openings being counterbored from above to form an annular internal, upwardly facing shoulder, and having at least one slot extending axially through said shoulder, said opening having a cylindrical wall with at least one outwardly extending detent therein; and quick release couplings for said selected ones of said openings in said adaptor plate comprising:

a sleeve adapted to be secured to a thimble tube and extend through a selected one of said openings in said adaptor plate;

a latch assembly rotatably mounted on said sleeve and having at least one outwardly projecting latch ear configured to pass through said at least one axial slot with said latch assembly in a first rotational position with said latch ear aligned with said slot, and said latch assembly having a second rotational position with said latch ear overlaying said shoulder, said latch assembly also having at least one radially compliant projection projecting radially outward and engaging said at least one detent in said cylindrical wall of said opening in said adaptor plate to latch said latch assembly in said second position;

retainer means securing said latch assembly on said sleeve; and a support plate fixed to and extending generally transversely to said sleeve and on which said adaptor plate seats, and at least one boss extending upward on said support plate and sized to engage said at least one axial slot; and said boss having an inner arcuate surface with an outwardly extending boss detent which is engaged by said radially compliant projection to latch said annular latch member in said first rotational position.

2. The top nozzle assembly of claim 1 wherein said adaptor plate has a pair of diametrically opposed axial slots extending through said shoulder and a pair of diametrically opposed detents in said opening, said latch assembly has a pair of diametrically opposed outwardly projecting latch ears configured to pass through said pair of axial slots with said latching assembly in said first rotational position, said a pair of diametrically opposed bosses extending upward on said support plate and sized to engage said pair of axial slots, each of said bosses having an arcuate inner surface with an outwardly directed boss detent therein, and said latching assembly having a pair of diametrically opposed compliant projections projecting radially outward to engage said pair of detents in said opening in said adaptor plate to latch said latching assembly in said second rotational position and engaging said boss detents to latch said latching assembly in said first rotational position.

3. The top nozzle assembly of claim 1 wherein said latch assembly comprises an annular latch member with said at least one latch ear projecting outwardly therefrom, and a latch spring having said radially compliant projection projecting radially outward therefrom.

4. The top nozzle assembly of claim 3 wherein said latch spring comprises a cylindrical body with said radially compliant projection projecting radially outward being formed by an outward bulge formed in a strip defined by a circumferentially extending slit spaced from a bottom edge of said cylindrical body.

5. The top nozzle assembly of claim 4 wherein said cylindrical body has at least one notch in an upper edge thereof through which said latch ear projects so that said annular latch member and spring member rotate together.

6. A quick release, removable top nozzle assembly for use in a nuclear fuel assembly having a plurality of thimble tubes, said top nozzle assembly comprising:

an adaptor plate having a plurality of spaced circular openings extending through said adaptor plate and aligned with said thimble tubes, selected ones of said openings being counterbored from above to form an annular internal upwardly facing shoulder and having at least one slot extending axially through said shoulder; and quick release couplings for said selected ones of said openings in said adaptor plate comprising:

a sleeve adapted to be secured to a thimble tube and extend through a selected one of said openings in said adaptor plate;

a support plate fixed to said sleeve and extending generally transversely thereto, and having at least one boss extending upward and sized to engage said at least one slot in said shoulder in said adaptor plate;

an annular latch member rotatably mounted on said sleeve above said support plate and having at least one outwardly projecting latch ear configured to pass through said at least one axial slot with said annular latch member in a first rotational position with said latch ear aligned with said slot, and said annular latch member having a second rotational position with said latch ear overlaying said shoulder;

a compliant member compliantly latching said annular latch member to said at least one boss to retain said annular latch member in said first position with said adaptor plate removed; and retainer means retaining said annular latch member on said sleeve.

7. The top nozzle assembly of claim 6 wherein said adaptor plate has a pair of diametrically opposed slots extending through said shoulder, said support plate has a pair of diametrically opposed bosses extending upwardly thereon and sized to engage said pair of slots, said annular latch member has a pair of diametrically opposed outwardly projecting latching ears, and said compliant member compliantly latching said annular latch member to said pair of bosses.

8. The top nozzle assembly of claim 7 wherein said compliant member has a pair of radially compliant outwardly extending complaint projections and said bosses have arcuate inner faces with detents engaged by said pair of outwardly extending compliant projections.

9. The top nozzle assembly of claim 8 wherein said openings in said adaptor plate have a pair of opposed detents, and said compliant projections on said compliant member engage said detents in said openings in said adaptor plate to latch said annular latch member in said second rotational position.

10. The top nozzle assembly of claim 8 wherein said compliant member has a cylindrical body and said pair of outwardly extending radially compliant projections are formed by outward bulges in strips defined by diametrically opposed circumferentially extending slits spaced from a bottom edge of said cylindrical body.

11. The top nozzle assembly of claim 10 wherein said cylindrical body has a pair of diametrically opposed notches and said pair of diametrically opposed latch ears projecting outwardly from said annular latch member engage said pair of notches to couple said latch member to said compliant member.

12. The top nozzle assembly of claim 11 wherein said selected ones of said openings in said adaptor plate have a pair of opposed detents, and said bulges in said compliant member engage said detents in said openings in the said adaptor plate to latch said annular latch member in said second rotational position.

* * * * *